United States Patent [19]
Fleming

[11] Patent Number: 5,067,759
[45] Date of Patent: * Nov. 26, 1991

[54] VEHICLE BUMPER ASSEMBLY WITH FOAMED CORE

[75] Inventor: Stephen D. Fleming, Rayleigh, United Kingdom

[73] Assignee: Ford Motor Company, Dearborn, Mich.

[*] Notice: The portion of the term of this patent subsequent to Jan. 29, 2008 has been disclaimed.

[21] Appl. No.: 597,632

[22] Filed: Oct. 15, 1990

Related U.S. Application Data

[63] Continuation of Ser. No. 858,486, Apr. 30, 1986, Pat. No. 4,988,137.

[51] Int. Cl.⁵ .................................................. B60R 19/18
[52] U.S. Cl. .................................... 293/109; 293/120
[58] Field of Search ............. 293/102, 109, 120, 121, 293/122, 126

[56] References Cited

U.S. PATENT DOCUMENTS

| | | | |
|---|---|---|---|
| 3,666,310 | 5/1972 | Burgess et al. | 293/110 |
| 3,802,727 | 4/1974 | Beckley | 293/120 |
| 3,860,279 | 1/1975 | Hulten | 293/120 |
| 4,109,951 | 8/1978 | Weller | 293/155 X |
| 4,134,610 | 1/1979 | Lindewall | 293/120 |
| 4,350,378 | 9/1982 | Wakamatsu | 293/120 |
| 4,598,001 | 7/1986 | Watanabe et al. | 293/120 X |

Primary Examiner—Russell D. Stormer
Attorney, Agent, or Firm—Damian Porcari; Clifford L. Sadler

[57] ABSTRACT

A vehicle bumper assembly comprises a channel-section outer shell (12) of injection moulded plastics material extending transversely across the front or rear (20) of a motor vehicle and having spaced apart brackets (32) for mounting the bumper on the motor vehicle. The outer shell (12) is substantially filled with an energy absorbing foam (24) adhered to the inside of the outer shell (12) and the mounting brackets (32) have arm portions (36) moulded in the foam filling (24).

3 Claims, 3 Drawing Sheets

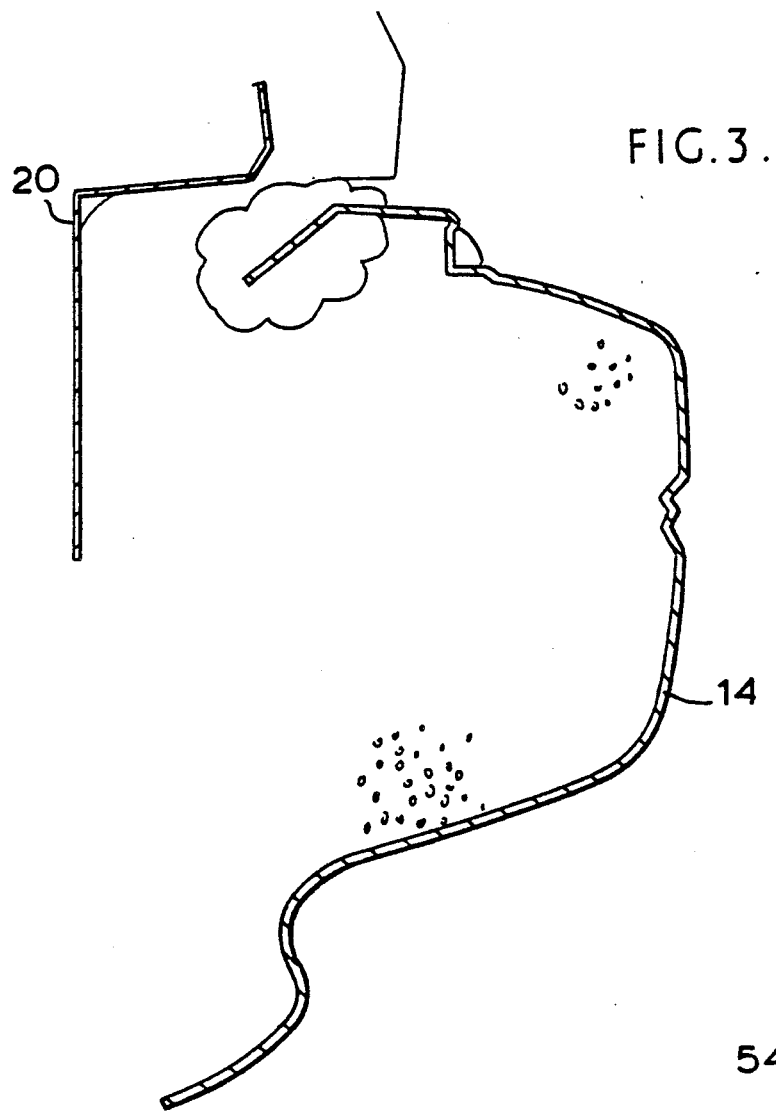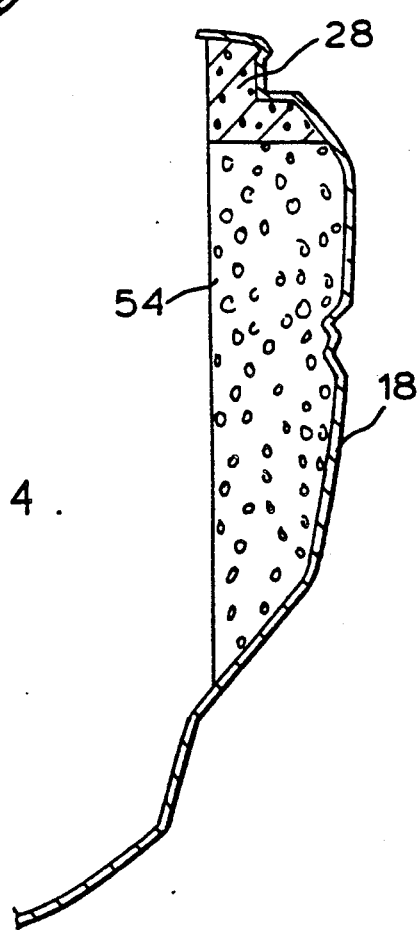

VEHICLE BUMPER ASSEMBLY WITH FOAMED CORE

This is a continuation of application Ser. No. 06/858,486, filed Apr. 30, 1986 and now Pat. No. 4,988,137.

This invention relates to a bumper assembly of plastics material for a motor vehicle.

A known form of vehicle bumper of plastics material is shown in our UK Patent Specification GB 2 118 489 A. This comprises a box structure formed from an injection moulded channel section outer member friction welded to a backing plate injection moulded from the same material. This structure has been used on the Ford Sierra vehicle and allows considerable styling freedom together with sufficient strength and energy absorbing characteristics to meet the applicable European regulations. However, a sufficient thickness of material must be used to avoid droop when a vehicle fitted with the bumper is put though a paint oven and to provide adequate strength for the bumper to survive low speed collisions without damage.

The improved bumper structure of the present invention allows a reduced thickness of plastics shell and obviates the need for an injection moulded backing member without loss of energy absorbing and damagability characteristics. By reducing the amount of shell material required, the cost and weight of the bumper is reduced.

According to the present invention we provide a vehicle bumper assembly comprising a channel-section outer shell of injection moulded plastics material for extending transversely across the front or rear of a motor vehicle and having integral end portions for extending along the sides of the motor vehicle, and spaced apart brackets for mounting the bumper on the motor vehicle, characterised in that:
 a. the transversely extending portion of the outer shell is sustantially filled with an energy absorbing foam adhered to the inside of the outer shell; and
 b. the mounting brackets have arm portions moulded into the foam filling.

The invention will now be described with reference to the accompanying drawings, in which:

FIG. 3 is a section along the line III—III of FIG. 1;

FIG. 4 is a section along the line IV—IV of FIG. 1;

Figure 1:
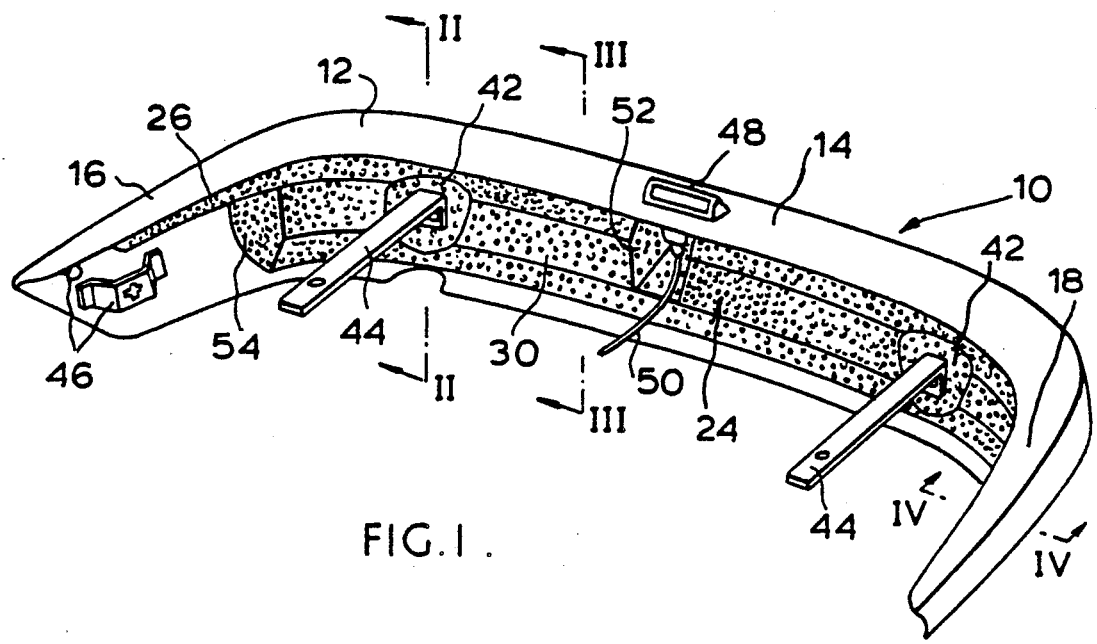
FIG. 1 is a perspective diagrammatic view from above of a motor vehicle rear bumper embodying the invention.
Figure 2:
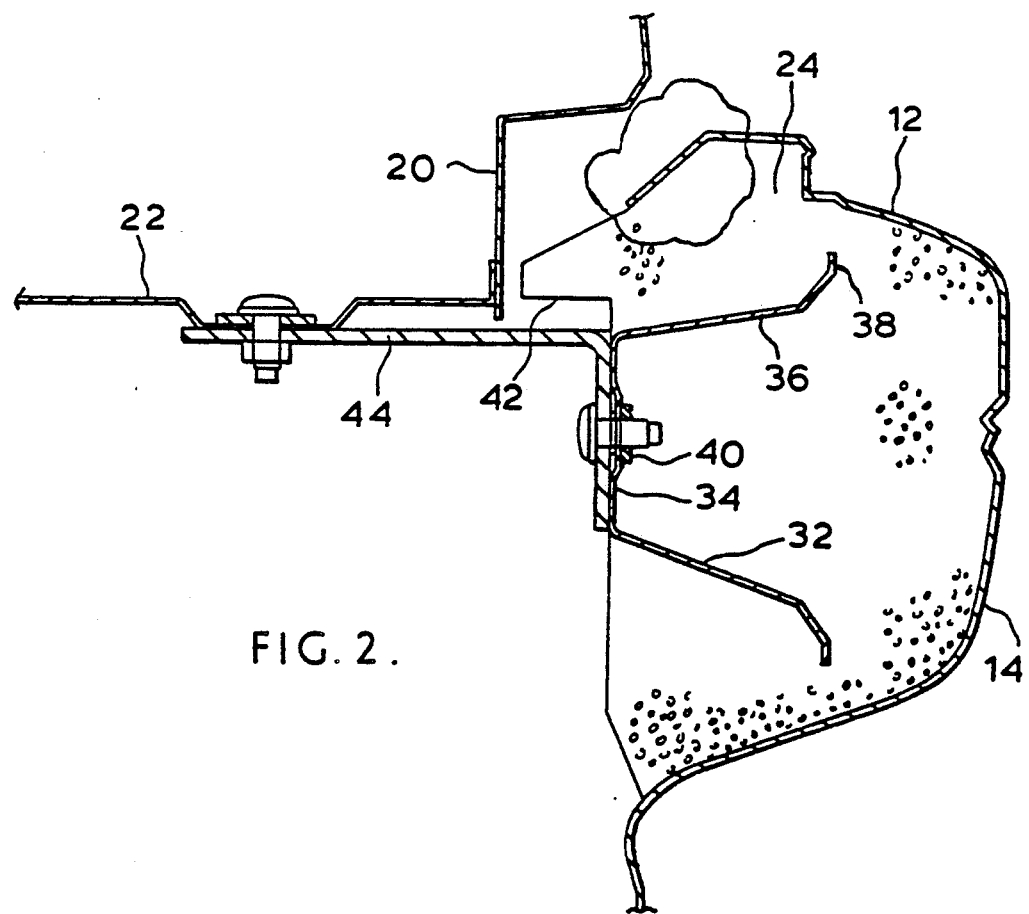
FIG. 2 is a section along the line II—II of FIG. 1 showing the bumper mounted on the vehicle.

A vehicle rear bumper assembly 10 embodying the invention comprises an outer shell 12 of injection moulded polycarbonate plastics material. The shell 12 is of generally channel section with a transversely extending main run 14 with integally moulded end portions 16 and 18 each of which extends along a respective side of the vehicle (of which only parts of the rear cross-member 20 and longitudinal frame member 22 are shown in FIGS. 2 and 3).

The outer shell 12 is supported and strengthened by a foam filling 24 formed in situ in the main run 14 of the shell 12 with forwardly extending runners 26 and 28 which underlie and support the upper surfaces of end portions 16 and 18. The forward surface 30 of the foam filling 24 is shaped to follow closely the rear face of the vehicle rear cross-member 20 as shown in FIG. 3.

Figure 5:
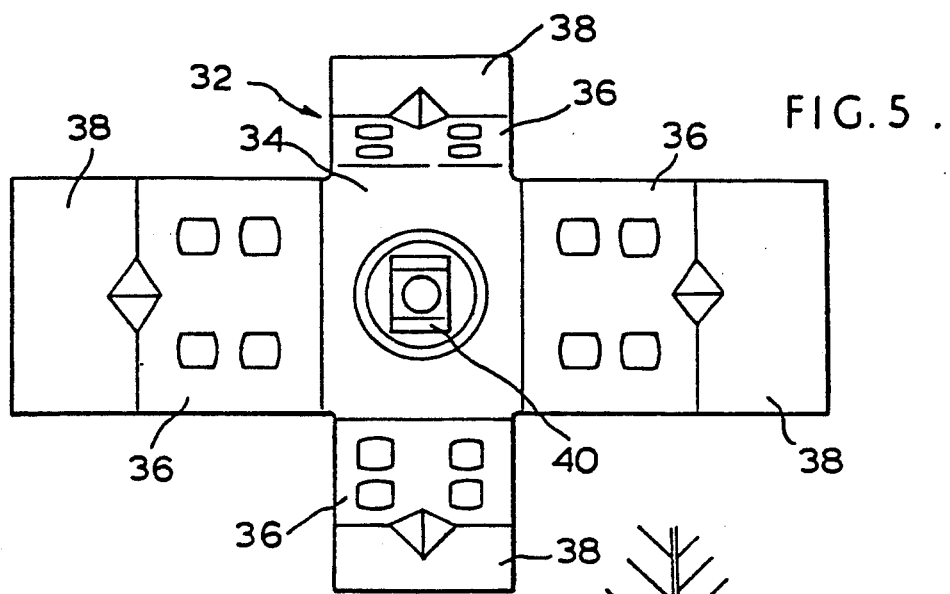
FIG. 5 is a view of the mounting bracket in the direction of arrow V in FIG. 2.

A pair of sheet metal mounting brackets 32 (FIGS. 2 and 5) are moulded into the foam filling 24, one adjacent each end of the main run 14. Each bracket 32 comprises a mounting area 34 lying sustantially coplanar with the outer surface of the foam filling and four apertured arms 36 extending into the foam filling. Each arm 36 is apertured as shown in FIG. 5 and hooked outwardly at its its outer end 38 to provide an extensive contact area with the foam filling. Adhesion of the foam to the backets 32 and the key provided by their shape ensures good retention of the brackets in the foam filling over the lifetime of the bumper.

A nut 40 is fixed to each mounting area 34. Recesses 42 in the surface of the foam filling provide access to the mounting areas 34. Bumper support arms 44 are bolted at their rear ends to a respective mounting area 34 and to the rear end of a respective longitudinal frame member 22. The forward ends of the end portions 16 and 18 are supported on the vehicle rear fenders by fastening means 46 described fully in our UK Patent Application GB 2 118 489 A.

A number plate illumination lamp 48 is fixed in an aperture in the upper surface of the main run 14.

Access to the lamp 48 and its wiring 50 is provided by a recess 52 in the foam filling part of which is undercut by water jet after the foam filling has been formed.

Impact absorption requirements for the end portions 16 and 18 can be met without a full foam filling. The filling is carried round the corners of the bumper up to surfaces 54. The runners 26 and 28 line only the upper part of the end portions 16 and 18 to support the upper surfaces against any tendency to sag when the vehicle is put through a paint oven.

Figure 6:
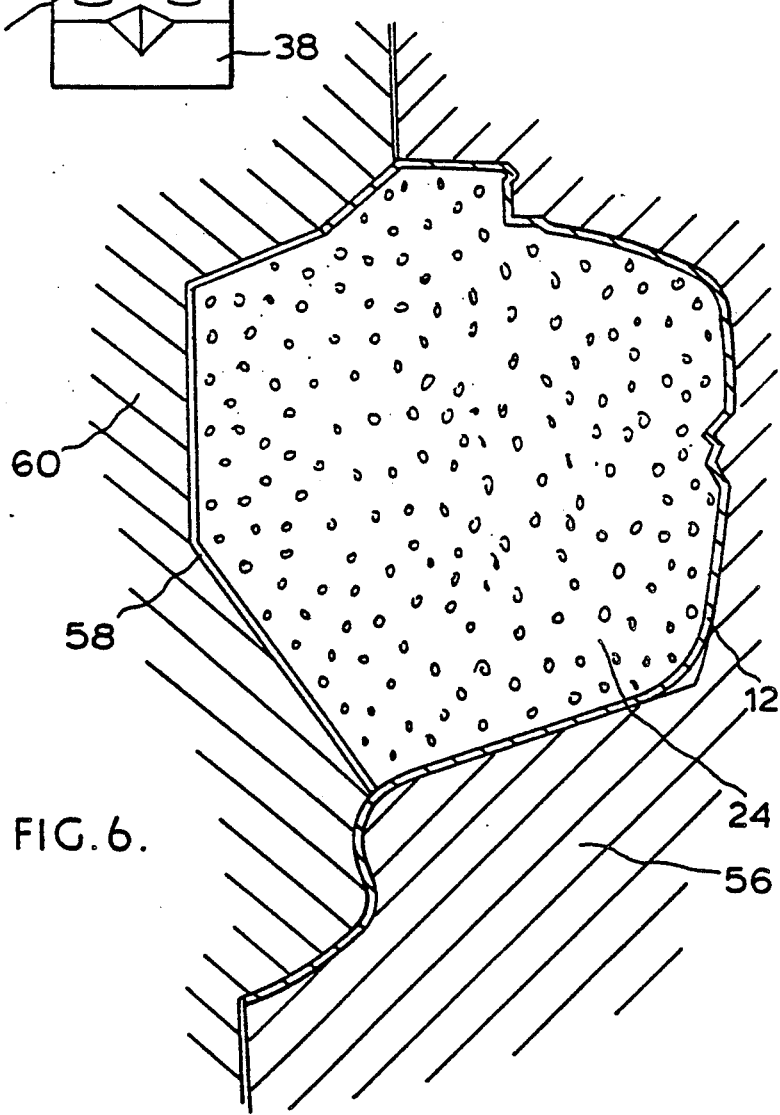
FIG. 6 is a section of the bumper assembly in a moulding tool immediately after the foaming process, the section being taken through the same part of the bumper as the section of FIG. 2.

A method of making the bumper of the invention is illustrated in FIG. 6. The outer shell is placed in one part 56 of a moulding tool. A vacuum formed polypropylene liner 58 is held in place on the other part 60 of the moulding tool by vacuum. The liner 58 and contacting face of the tool have the shape required for the outer surface of the foam filling 24. A two component polyurethane foam material made by mixing a polyol and an isocyanate is introduced into the mould and allowed to react and foam to filled the mould cavity. After partial curing the bumper is removed from the mould and left to finish curing with the liner 58 over the outer surface of the foam. When the foam is sufficiently stable the liner is removed and reused in subsequent foaming operations.

The foam material is selected for energy absorbing properties and for good adhesion to the polycarbonate shell and to the metal of the mounting brackets. The liner 58 prevents adhesion of the foam to the mould without requiring the use of liquid release agents which have to cleaned off the finished bumper and can cause paint adhesion problems during later finishing processes.

The vehicle bumper described makes effective use of the energy absorbing properties of the foam because, in the event of an impact the foam filling is crushed between the vehicle cross-member 20 and the outer shell 24. The bumper need not have great beam strength because the main run is supported against bending in the event of an impact between the supporting brackets by contact of the foam filling with the vehicle cross-member.

The same structure may be used also for a vehicle front bumper.

I claim:

1. A vehicle bumper assembly comprising a channel-section outer shell of injected moulded plastics material for extending transversely across the front or rear of a motor vehicle and having integral end portions for extending along the sides of the motor vehicle, and spaced apart mounting brackets for mounting the bumper on the motor vehicle, wherein a transversely extending portion of the outer shell is substantially filled with an energy absorbing foam adhered to the inside of the outer shell; and the mounting brackets have apertured arm portions spaced apart from the outer shell and moulded into said foam, and the mounting brackets have support portions extending from the foam for directly attaching the bumper to the motor vehicle.

2. A vehicle bumper assembly is claimed in claim 1 wherein said energy absorbing foam is polyurethane.

3. A vehicle bumper assembly is claimed in claim 1 wherein said outer shell is made of polycarbonate.

* * * * *